J. BAIN.
EXPANDING HORSE HOE.
APPLICATION FILED JUNE 25, 1910.

1,001,801.

Patented Aug. 29, 1911.
2 SHEETS—SHEET 1.

WITNESSES

INVENTOR
James Bain
ATTY

J. BAIN.
EXPANDING HORSE HOE.
APPLICATION FILED JUNE 25, 1910.

1,001,801.

Patented Aug. 29, 1911.
2 SHEETS—SHEET 2.

WITNESSES

INVENTOR
James Bain

UNITED STATES PATENT OFFICE.

JAMES BAIN, OF WAIPAHI, NEW ZEALAND.

EXPANDING HORSE-HOE.

1,001,801.  Specification of Letters Patent.  Patented Aug. 29, 1911.

Application filed June 25, 1910. Serial No. 568,856.

*To all whom it may concern:*

Be it known that I, JAMES BAIN, farmer, a subject of His Majesty the King of Great Britain, residing at Waipahi, in the Province of Otago, in the British Dominion of New Zealand, have invented certain new and useful Improvements in and Relating to Expanding Horse-Hoes and the Like Implements; and I do hereby declare the following to be a full, clear, and exact description of the invention, such as will enable others skilled in the art to which it appertains to make and use the same.

This invention relates to expanding horse hoes, a class of farming implement used principally for weeding between drills.

The object of the invention is to provide means for adjusting expanding horse hoes without losing grip of the guide handles.

A common method of adjustment is by a separate vertical lever pivoted to handle braces and connected to a sliding block attached to the center bar. The block when operated and through the medium of pivoted connecting rods increases or reduces, as desired, the angle of the side bars which are pivoted at their inner ends to permit adjustment. The guide handles are secured to the center bar and the movement provided to expand the side bars is an entirely separate operation. In my invention I dispense with vertical regulating lever. The guide handles are pivotally connected to each other and to the side bars of the horse hoe. Means are provided to lock the guide handles and retain adjustment. I introduce indirect coupling between the sliding block on the center bar and the draft chain, the details of which are more fully described hereinafter.

Figure 1:
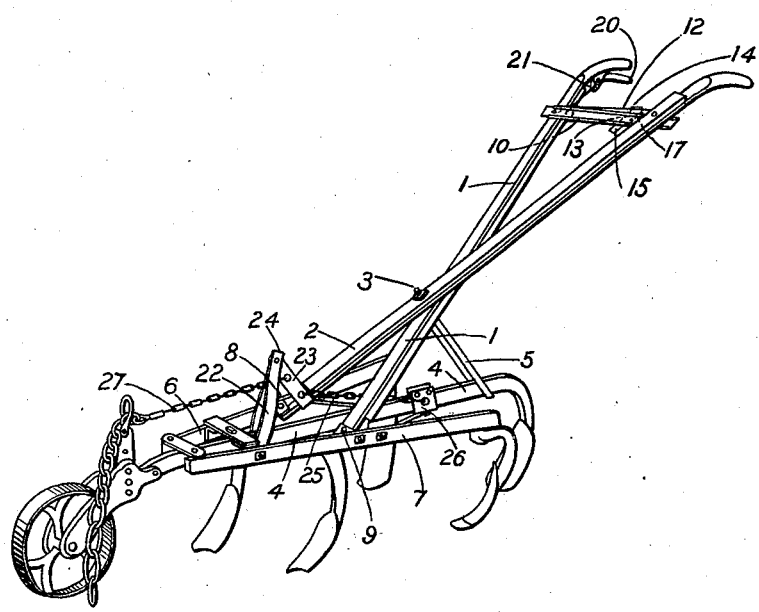
Figure 2:
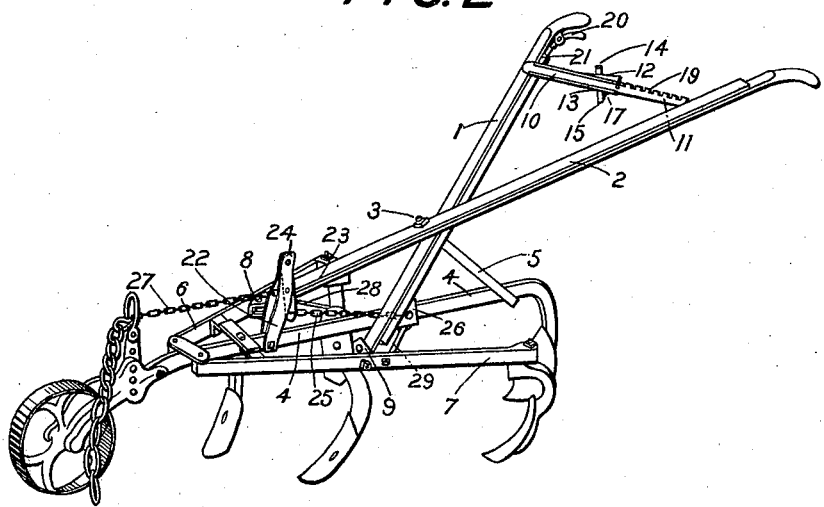
Figure 3:
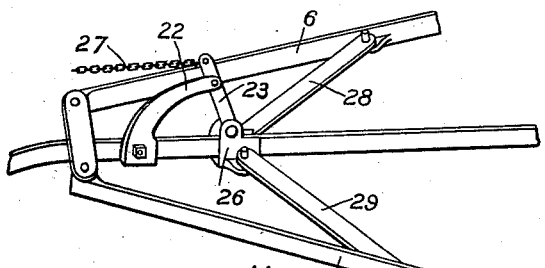
Figure 5:
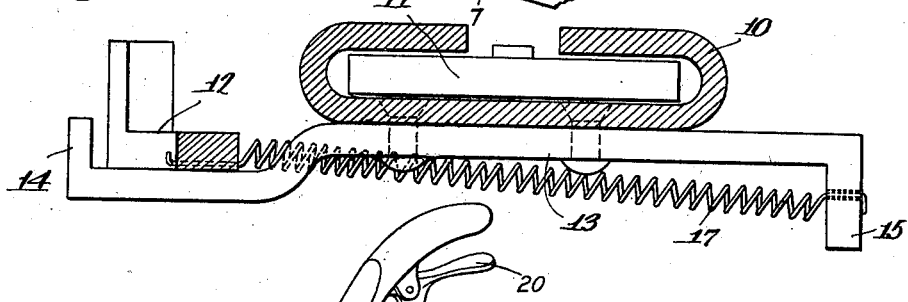
Figure 4:
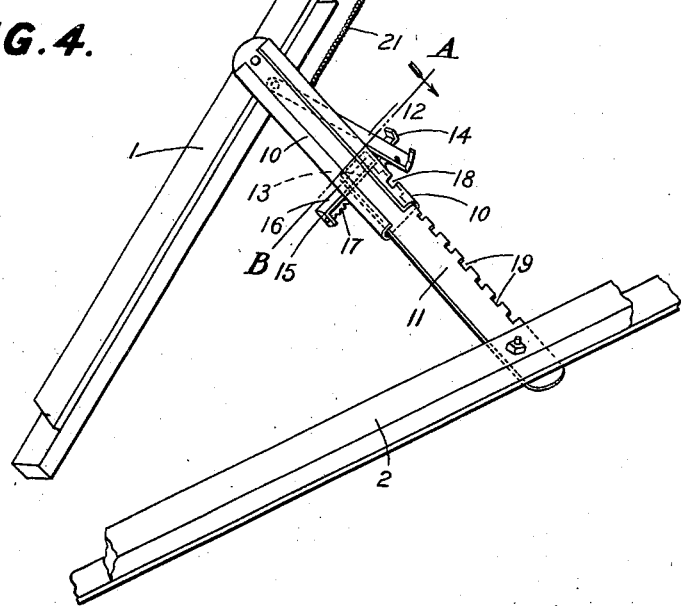

Referring to the drawings, accompanying this specification. Figure 1 is a perspective view of my horse hoe. Fig. 2 is a perspective view of the side bars expanded. Fig. 3 illustrates a modification of the coupling. Fig. 4 is an enlarged detail view. Fig. 5 is an enlarged sectional view of locking attachment taken on the line A. B. (Fig. 4) looking in the direction indicated by the arrow in Fig. 4.

Similar letters of reference indicate corresponding parts.

Referring to the numerals on the drawings, 1 and 2 represent the guide handles which are pivoted together at 3 and suitably stayed to the center bar 4 as indicated at 5. The said handles are pivoted to the side arms 6 and 7. Suitable brackets 8 and 9 are provided for the purpose. It will be readily understood that with handles constructed as described increasing or reducing the angle of the side bars without losing grip of the handles is a simple operation.

The locking attachment more clearly illustrated in Figs. 4 and 5 consists of a channeled member 10 carried by one of the guide handles and a notched bar 11 carried by the other of the guide handles and slidingly engaging the channel of the member 10. The bar 13 is riveted to the under side of the channeled member 10 and projects beyond each edge thereon. A portion 14 of one end of the bar 13 is bent at right angles to form a stop and guide for a catch 12, preferably pivoted to the member 10, and at the other end of the bar 13, a lug 15 is formed to which one end of a spring 17 is attached, the other end of the spring being attached to the catch 12.

The catch under the influence of the spring 17 is retained normally in engagement with a notch 18 formed in the member 10 and with any one of a series of notches 19 formed in the bar 11 that may be in registry with the notch 18 according to the width of adjustment desired. The catch 12 is moved out of engagement with the notches 18 and 19 by means of the grip trigger 20 which is connected with the said catch in any suitable manner, as for example, by means of a wire 21.

When it is desired to change the angle between the side bars it is merely necessary to actuate the trigger 20 to disengage the catch 12 from the slots 18 and 19, move the guide handles toward or way from one another as desired and then release the trigger, thereby allowing the spring 17 to pull the catch 12 back into its operative position.

There is a bracket 22 secured to the center bar 4 of the horse hoe, a lever 23 is pivoted to the upper end 24 of the said bracket 22. There is a connecting rod or chain 25 coupling the sliding block 26 with the lever 23 and a coupling rod or chain 27 coupling the lever to the ordinary draft block or shackle. The position of attaching the said coupling 25 and 27 is arranged so that the pull exerted by a horse will be approximately equal to the pressure exercised by the passage of the hoe through the ground. The sliding block 26 which is coupled to the side bars 1 and 2 by pivoted connecting rods 28 and 29 moves upon the middle bar with perfect freedom. Through the medium of indirect coupling with the block 26 and through the medium of the pivoted connecting rods 28 and 29 a pressure is maintained opposing the force acting on the side bar of the horse hoe when in operation.

It has been found by experiment that the rod or chain 25 attached to the draft block or shackle gives the best result when the connection is at the point on the lever 23 approximately one-third of the distance between the fulcrum and the point on the said lever where the connecting rod or chain 27 couples the sliding block.

The action of pulling the horse hoe creates the opposing force and makes the manipulation of the side bars comparatively easy.

Referring to Fig. 3 which illustrates another method of coupling the draft to oppose the force on the side bars caused by the passage of the hoe in operation, the lever 23 is pivotally connected to the sliding block 26 and the pivoted connected rods 28 and 29 are connected to the side bars 6 and 7 at a reverse angle to the first mentioned method.

What I claim and desire to secure by Letters Patent is—

1. In an expanding horse hoe, as described, a locking and an adjusting device consisting of a flanged channel piece, 10, a notched bar, 11, a spring-actuated catch, 12, operated by a trigger-grip, 20, the said catch being designed to engage with the notch, 18, on the channel-piece, 10, and with any one of the series of notches, 19, on the notched bar, 11, according to the adjustment desired, all the parts being arranged to operate in the manner and for the purpose specified.

2. In an expanding horse hoe, as described, a locking and an adjustable device consisting of a flanged channel-piece, 10, a notched bar, 11, a spring-actuated catch, 12, operated by a trigger-grip, 20, the said catch being designed to engage with the notch, 18, on the channel-piece, 10, and with any one of the series of notches, 19, on the notched bar, 11, according to the adjustment desired, in combination with pivotally-connected guide handles 1 and 2 for the purpose of adjusting the side-bars, 6 and 7, of the hoe, all the parts arranged to operate in the manner and for the purpose specified.

3. In an expanding horse hoe, as described, a draft connection or coupling consisting of a rigid bracket, 22, a lever, 23, pivotally-connected thereto, a connecting rod or chain, 27, leading to an ordinary draft-block or shackle, a connecting rod or chain, 25, coupling the said lever 23 with a slidable block, 26, the said sliding block being coupled to the side bars of the horse hoe by pivoted connecting rods, 28 and 29, all arranged to operate in the manner and for the purpose specified.

In testimony whereof, I affix my signature, in presence of two witnesses.

JAMES BAIN.

Witnesses:
 RORERT WALES,
 ROBERT PARK, Jr.

Copies of this patent may be obtained for five cents each, by addressing the "Commissioner of Patents, Washington, D. C."